United States Patent [19]

Ohta et al.

[11] Patent Number: 4,740,947
[45] Date of Patent: Apr. 26, 1988

[54] DUAL SURFACE OPTICAL MEMORY DISC

[75] Inventors: Kenji Ohta, Yao; Akira Takahashi; Hiroyuki Katayama, both of Nara; Junji Hirogane, Tenri; Yoshiteru Murakami, Nishinomiya, all of Japan

[73] Assignee: Sharp Kabushiki Kaisha, Osaka, Japan

[21] Appl. No.: 61,034

[22] Filed: Jun. 12, 1987

Related U.S. Application Data

[63] Continuation of Ser. No. 726,319, Apr. 23, 1985, abandoned.

[30] Foreign Application Priority Data

Apr. 25, 1984 [JP] Japan ................................. 59-84599
Apr. 26, 1984 [JP] Japan ................................. 59-86699

[51] Int. Cl.⁴ .............................................. G11B 7/24
[52] U.S. Cl. .................................. 369/286; 346/135.1; 369/284; 369/288
[58] Field of Search ............... 369/280, 283, 284, 285, 369/286; 346/135.1, 137; 360/135; 350/344

[56] References Cited

U.S. PATENT DOCUMENTS

| | | | |
|---|---|---|---|
| 3,808,399 | 4/1974 | Payne et al. | 219/216 |
| 3,938,879 | 2/1976 | Dalmasso | 350/344 |
| 4,283,119 | 8/1981 | Hofmann | 350/344 |
| 4,390,600 | 6/1983 | Ohta et al. | 428/621 |
| 4,414,650 | 11/1983 | Ohta et al. | 365/122 |
| 4,467,383 | 8/1984 | Ohta et al. | 360/131 |
| 4,489,139 | 12/1984 | Ohta et al. | 428/621 |
| 4,503,531 | 3/1985 | Kato | 369/284 |
| 4,544,443 | 10/1985 | Ohta et al. | 156/643 |
| 4,564,932 | 1/1986 | Lange | 369/284 |
| 4,610,912 | 9/1986 | Takahashi et al. | 428/213 |
| 4,634,617 | 1/1987 | Ohta et al. | 428/65 |
| 4,640,584 | 2/1987 | Tsubakimoto et al. | 350/344 |
| 4,643,528 | 2/1987 | Bell | 350/344 |
| 4,644,520 | 2/1987 | Lange | 369/284 |

FOREIGN PATENT DOCUMENTS 8201556 11/1982 Netherlands ................. 369/284

Primary Examiner—Steven L. Stephan
Attorney, Agent, or Firm—Birch, Stewart, Kolasch & Birch

[57] ABSTRACT

A first optical memory disc and a second optical memory disc are fixed to each other by an adhesive layer so as to form a dual-surface optical memory disc. In a manufacturing step, an adhesive, preferably pre-cured photo-polymer mixed with spherical spacer elements, is painted on either one of or both of the first and second optical memory discs. When a predetermined pressure is applied between the two optical memory discs, the thickness of the adhesive layer is fixed by the diameter of the spherical spacer elements. While the pressure is applied between the two optical memory discs, ultraviolet rays are applied to the adhesive layer through one of the first or second optical memory discs so as to cure the photo-polymer, thereby tightly joining the first and second optical memory discs to each other.

5 Claims, 2 Drawing Sheets

DUAL SURFACE OPTICAL MEMORY DISC

This is a continuation of application Ser. No. 726,319, filed Apr. 23, 1985 and now abandoned.

BACKGROUND OF THE INVENTION

1. Field of the Invention

The present invention relates to an optical memory element on which a laser beam is impinged to record, read out or erase the information onto or from the optical memory element. The present invention relates, more particularly, to a dual-surface optical memory disc including separate two optical memory elements.

2. Description of the Prior Art

Recently, an optical memory system has been developed, which optically stores the information in high density and in the mass storage order. Especially, the optical memory disc will be widely utilized because the optical memory disc ensures a rapid access to the desired information. A dual-surface (double-sided structure) optical memory disc is proposed in a copending U.S. patent application Ser. No. 638,674, "OPTICAL MEMORY DISC", filed on Aug. 8, 1984, and assigned to the same assignee as the present application. The dual-surface optical memory disc is effective to increase the memory capacity on one optical memory disc.

However, in the conventional dual-surface optical memory disc such as proposed in the U.S. patent application Ser. No. 638,674, the thickness of the optical memory disc is not accurately controlled. Therefore, the rotating condition of the conventional dual-surface optical memory disc is not always stable.

OBJECTS AND SUMMARY OF THE INVENTION

Objects of the Invention

Accordingly, an object of the present invention is to provide a dual-surface optical memory disc which ensures a stable operation of the optical memory system.

Another object of the present invention is to provide a dual-surface optical memory disc having a uniform thickness over the entire disc size.

Still another object of the present invention is to provide a dual-surface optical memory disc which ensures a stable rotation in the optical memory system.

Other objects and further scope of applicability of the present invention will become apparent from the detailed description give hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the Invention

To achieve the above objects, pursuant to an embodiment of the present invention, two optical memory elements are adhered to each other by an adhesive layer. The adhesive layer is preferably made of a photo-polymer. Spacer beads are mixed and distributed in the photo-polymer layer so as to determine the thickness of the adhesive layer, thereby ensuring the uniform thickness of the dual-surface optical memory disc.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

In order to facilitate a better understanding of the present invention, the conventional dual-surface optical memory disc will be first described with reference to FIG. 1.

The conventional dual-surface optical memory disc includes two transparent substrates 10 and 12, and two recording layers 14 and 16 formed on the two transparent substrates 10 and 12, respectively. Each of the transparent substrates 10 and 12 is preferably a resin substrate made of, for example, PMMA, or a glass substrate. Each of the recording layers 14 and 16 is preferably a single layer of a magneto-optic memory element, or preferably has a multi-layered structure including a dielectric layer, a magneto-optic memory layer and a reflection layer. The two optical memory discs (10 and 14, and 12 and 16) are adhered to each other by the intervention of an adhesive layer 18 made of, for example, a photo-polymer.

The dual-surface optical memory disc is effective to in increasing the memory capacity,. Further, there is the possibility that, in the case resin substrates are employed, the bend of the resin substrates are minimized because the two resin substrates are fixed to each other with the intervention of the adhesive layer 18.

However, the disc thickness is not uniform because the thickness of the adhesive layer 18 is not consistent. The non-uniform disc thickness precludes a stable rotation of the dual-surface optical memory disc.

Figure 1:
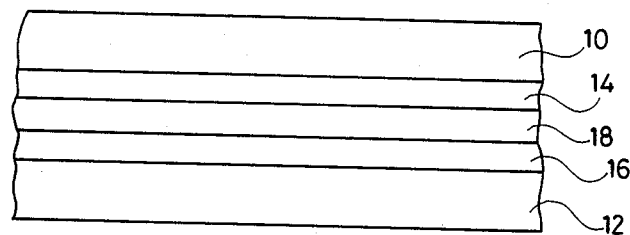
FIG. 1 is a sectional view of an essential part of the conventional dual-surface optical memory disc.
Figure 2:
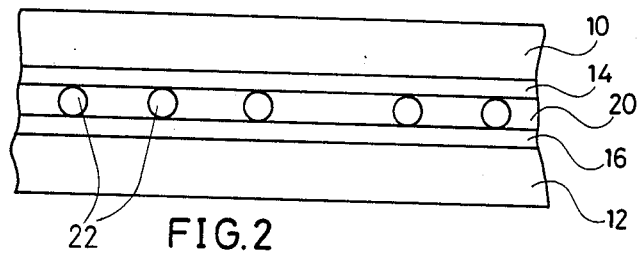
FIG. 2 is a sectional view of an essential part of an embodiment of a dual-surface optical memory disc of the present invention.

FIG. 2 shows an essential part of an embodiment of a dual-surface optical memory disc of the present invention. Like elements corresponding to those of FIG. 1 are indicated by like numerals.

Similar to the dual-surface optical memory disc shown in FIG. 1, the recording layer 14 is formed on the transparent disc substrate 10, and the recording layer 16 is formed on the transparent disc substrate 12, respectively. The two optical memory discs, each including the recording layer formed on the transparent substrate, are adhered to each other by the intervention of an adhesive layer 20 in a manner that the recording layers 14 and 16 confront each other. The adhesive layer 20 is preferably made of a photo-polymer.

Spherical spacer elements 22 are mixed and distributed in the adhesive layer 20 so as to determine the thickness of the adhesive layer 20. When the spacer element 22 has a refractive index similar to the photopolymer, more specifically, when the spacer element 22 has a refractive index of about 1.4 to 1.6 then, the spherical spacer elements 22 are optically negligible in the adhesive layer 20. The minimum thickness of the adhesive layer 20 is determined by the diameter of the spherical spacer elements 22. The accuracy of the thickness of the adhesive layer 20 is controllable by the accuracy of the diameter of the spherical spacer elements 22. The spherical spacer elements 22 are preferably made of glass of resin such as PMMA. A preferred diameter of the spacer element 22 is about 50 to 100 μm.

A method for manufacturing the dual-surface optical memory disc of FIG. 2 is as follows.

(1) The recording layer 14 is formed on the transparent disc substrate 10, and the recording layer 16 is formed on the transparent disc substrate 12, respectively. The thickness of the recording layers 14 and 16 is preferably less than the thickness of the transparent disc substrates 10 and 12 so that the recording layers 14 and 16 are not formed at the periphery portions of the transparent disc substrates 10 and 12 respectively.

(2) The spherical spacer elements 22 are mixed with the pre-cured photo-polymer, and the mixed components are stired well. A preferred volume ratio of the photo-polymer and the spherical spacer elements is 100:1 through 10:1.

(3) Air bubbles included in the mixed adhesive (including the pre-cured photo-polymer and the spherical spacer elements) are removed through the use of the vacuum technique.

(4) The adhesive formed by the above-mentioned step (3) is painted on either one or both of the recording layers 14 and 16.

Figure 3:
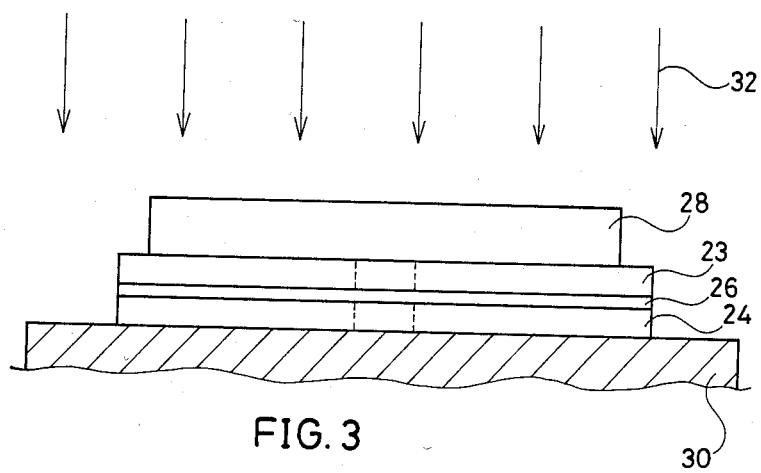
FIG. 3 is a sectional view showing a manufacturing step of the dual-surface optical memory disc of FIG. 2.

(5) Referring to FIG. 3, one optical memory element 23, including the transparent disc substrate 10 and the recording layer 14, is disposed on the other optical memory element 24, including the transparent disc substrate 12 and the recording layer 16 with the intervention of the mixed adhesive 26, including the precured photo-polymer and the spherical spacer elements 22, in a manner that the recording layers confront each other. After a center adjustment is conducted, a predetermined pressure is applied to the two optical memory elements 23 and 24 through the use of a pair of pressing plates 28 and 30. The diameter of the upper pressing plate 28 is preferably smaller than the diameter of the transparent disc substrates 10 and 12 of the optical memory elements 23 and 24, as shown in FIG. 3.

Figure 4:
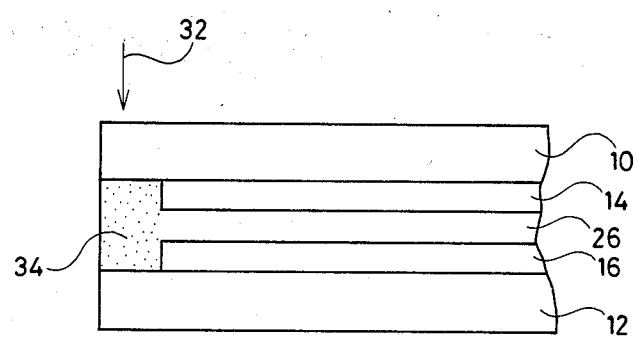
FIG. 4 is a sectional view of another essential part of the dual-surface optical memory disc of FIG. 2.

(6) Pressure is applied between the pressing plates 28 and 30 so that the thickness of the adhesive layer 20 reaches a minimum value determined by the spherical spacer elements 22 distributed in the pre-cured adhesive 26. Ultraviolet rays 32 are applied to the optical memory elements 23 and 24 from the side of the upper pressing plate 28 as shown in FIG. 3. In a preferred form, the recording layers 14 and 16 of the optical memory elements 23 and 24 have a diameter smaller than that of the transparent disc substrates 10 and 12. The ultraviolet rays 32 reach the adhesive 26 at the periphery portion 34 thereof to cure the photo-polymer as shown in FIG. 4.

In this way, the two optical memory elements 23 and 24 are tightly fixed to each other with a predetermined distance therebetween. The thickness of the dual-surface optical memory disc of the present invention is uniform because the thickness of the adhesive layer 20 is accurately determined by the diameter of the spherical spacer elements 22.

When an anaerobic photo-polymer is employed as the adhesive, the tight connection is further ensured. More specifically, the anaerobic photo-polymer gradually cures at positions where the ultraviolet rays are not applied, thereby further tightly fixing the two optical memory elements 23 and 24 to each other.

Figure 5:
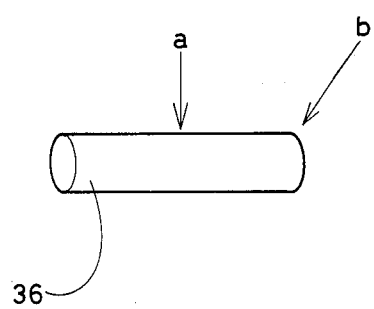
FIG. 5 is a perspective view of another example of a spacer related to the dual-surface optical memory element of the present invention.

The spacer elements are not necessarily spherical in shape. FIG. 5 shows a cylindrical spacer element 36. When the cylindrical spacer element is made of glass, the shape of the cylindrical spacer element 36 is hardly changed when the force is applied to the cylindrical spacer element 36 in the direction shown by the arrow "a". However, the cylindrical spacer element 36 will easily break when the force is applied to the cylindrical spacer element in the direction shown by the arrow "b". Accordingly, the thickness of the adhesive layer will become identical to the diameter of the cylindrical spacer element 36.

When the cylindrical space element is made of resin, such as PMMA, the entire cylindrical spacer element may be laid down if the cylindrical spacer element has a sufficient height.

The upper pressing place 28 not necessarily any circular plate, but can be a desired shape which includes a portion through which ultraviolet rays reach the optical memory elements 23 and 24 where the recording layers 14 and 16 are formed.

The invention being thus described, it will be obvious that the same may be varied in many ways without departure from the spirit and scope of the invention, which is limited only by the following claims.

What is claimed is:

1. A double-sided optical memory device comprising:
    a first optical memory element including
       a first transparent substrate, and
       a first recording layer formed on said first transparent substrate;
    a second optical memory element including
       a second transparent substrate, and
       a second recording layer formed on said second transparent substrate; and
    an adhesive layer consisting essentially of a photo-polymer disposed between said respective recording layers of each of said first optical memory element and said second optical memory element, said adhesive layer including spacer elements of equal diameter distributed therein so as to produce a memory device of uniform thickness, thereby stabilizing rotation of said optical memory device, said adhesive layer and spacer elements being made of transparent material having similar refractive indices.

2. The optical memory device of claim 1, wherein said adhesive layer is an anaerobic photopolymer.

3. The optical memory device of claim 1, wherein said spacer elements are spherical glass spacers having a refractive index of from 1.4 to 1.6 mixed in said photopolymer.

4. The optical memory device of claim 1, wherein said first and second transparent substrates are transparent disc substrates, and said first and second recording layers are each shaped so as to have a diameter less than that of said transparent disc substrates.

5. The optical memory device of claim 1, wherein said spacer elements glass cylindrical elements having a refractive index of from about 1.4 to 1.6 distributed in said photopolymer.

* * * * *